UNITED STATES PATENT OFFICE.

KARL J. JACOBI, OF ROSELLE PARK, NEW JERSEY, ASSIGNOR TO PACIFIC COAST BORAX COMPANY, OF NEW YORK, N. Y., A CORPORATION OF NEVADA.

RECOVERY OF POTASSIUM SALTS AND BORAX.

1,349,134.     Specification of Letters Patent.     Patented Aug. 10, 1920.

No Drawing.     Application filed August 25, 1919. Serial No. 319,744.

*To all whom it may concern:*

Be it known that I, KARL J. JACOBI, a citizen of the United States, residing at Roselle Park, in the county of Union, State of New Jersey, have invented certain new and useful Improvements in the Recovery of Potassium Salts and Borax; and I do hereby declare the following to be a full, clear, and exact description of the invention, such as will enable others skilled in the art to which it appertains to make and use the same.

This invention relates to improvements in recovery of potassium salts and borax from brines of the character of the Searles Lake brine.

In the treatment of these brines, as heretofore practised, it has been customary to concentrate the brines until a portion of the sodium salts has separated therefrom and the solution has become nearly saturated with potassium salts, then to filter the concentrated brine from the separated salts, and permit the filtered brine to cool. Potassium salts made up largely of chlorid are obtained in this way, but it is contaminated with a very considerable amount of borax, and correspondingly impure potassium salts are accordingly obtained. It is customary then to return the brines, after the separation of the impure potassium salts therefrom, for further concentration or for admixture with fresh amounts of brine.

According to the present invention, the potassium salts are obtained in part in a state of high purity, and in part in the form of a mixture of potassium salts and borax, which is further treated for the separation of the potassium salts and borax.

The invention will be further illustrated by the following specific description

The brine, for example, Searles Lake brine, is concentrated in an evaporator until about 55 to 60 per cent. of the total sodium carbonate content of the brine is separated out together with other sodium salts, such as sodium sulfate and chlorid. During this evaporation the potassium chlorid and sulfate content of the brine is increased nearly to saturation. The concentrated brine or mother liquor, after filtration of the separated sodium salts while still hot, is then permitted slowly to cool to a suitable temperature, as, for example, about 115° or 120° F., during which time a considerable part of the potassium salts separate out in a relatively pure form, *i. e.*, relatively free from borax. Potassium salts can thus be obtained which, when freed from mother liquor, contains a low percentage of borax, which may be as little as one per cent. or less, and containing as high as 90 to 94 per cent. of potassium salts calculated as potassium chlorid. The temperature at which the desirable result is accomplished is a variable factor which depends upon numerous conditions and I do not desire that the invention be limited to the specific range of temperatures mentioned. If the mother liquor is permitted to cool to a temperature very much below that indicated, borax will begin to separate out as well, and the potassium salts will be less pure. Accordingly, after the first separation of relatively pure potassium salts, the potassium salts are filtered out and obtained in a state relatively free from borax. The mother liquor is then transferred to another tank where it is permitted to cool down to ordinary temperature and in which a separation of potassium salts and borax takes place. The mixture of potassium salts and borax thus obtained is filtered off and is separately treated for the recovery of the potassium salts and borax therefrom, in a relatively pure state, *i. e.*, relatively free from each other.

The cold mother liquor remaining after removal of the mixed crystals is now acidified with a suitable acid or acid compound, preferably hydrochloric acid, until the alkalinity, calculated as sodium oxid, is enough to form borax with the total amount of boric oxid present. This addition of acid results in the decomposition of a very considerable amount of carbonate present with resulting evolution of carbon dioxid. Arsenic, which is present in appreciable quantities, is precipitated, as a result of acidification. Acidification as above described, may when desired, precede the first separation of the potassium salts.

The liquor is then again concentrated in much the same manner as before and the concentration is continued until a considerable portion of the remaining sodium salts are separated out. The reconcentrated liquor, after filtering from the arsenic and sodium salts, is again permitted to cool, first for the separation of relatively pure potassium salts, i. e., relatively free from borax, and containing from 60 to 80 per cent. or more of potassium salts figured as potassium chlorid, the remainder being mainly sodium chlorid and other sodium salts, which potassium salts are filtered off, and then to ordinary temperatures for the separation of a further amount of mixed potassium salts and borax. The crystals of potassium salts thus separated are substantially free from borax, although they may be admixed with sodium chlorid or other sodium salts. These crystals of potassium salts so separated can be freed from adhering mother liquor containing borax dissolved therein in any suitable manner.

The cold mother liquor remaining after this second concentration and crystallization can be further treated by concentration or, if it is small in amount, it can be returned to the evaporator and mixed with fresh amounts of acidified brine either before or after the primary separation of potassium salts therefrom, or with the mother liquor from other batches of brine.

The treatment of the mother liquor with acid can be effected while the mother liquor is still hot and prior to the cooling and crystallization thereof, but this is more objectionable and requires added precautions because of the vigorous evolution of carbon dioxid caused by the addition of the acid to the heated liquor. It is more advantageous and economical to add the acid to the cold mother liquor, after the separation of the crystals therefrom, than to treat the original brine, for the reason that a considerable portion of the soda ash will have been eliminated during the first concentration so that a correspondingly small amount of acid or acid compound is required.

The particular amount of acid or acid compound can be varied. In general, however, I prefer and recommend adding approximately the amount of acid above referred to so that the alkalinity will correspond to that of borax, that is, so that there will be sufficient sodium oxid to form borax with the total amount of boric acid present. Then, upon subsequent concentration and cooling, the boric acid $B_2O_3$ will be separated out in the form of borax and in admixture with the potassium salts.

By proceeding in the manner above described there is obtained, first, relatively pure potassium salts relatively free from borax, and, thereafter, mixed crystals of potassium salts and borax well adapted for subsequent treatment for the recovery of potash and borax therefrom. If, however, the alkalinity, after the addition of the hydrochloric acid, is not regulated in the manner described, the borax may be admixed with other borates, or with boric acid.

Instead of hydrochloric acid, other acids or acid compounds can be likewise employed, with corresponding modification of the process; but hydrochloric acid is well adapted for use and is to be recommended even though it is somewhat more expensive than sulfuric acid.

The mixed crystals obtained, as above described, contain much more borax than potassium salts; the amount of borax may be as much as two times the amount of potassium salts.

In order to effect the separation of the potassium salts from the borax the mixed crystals are dissolved in hot water and made into a solution of such a strength that, on crystallization of borax by cooling, no appreciable amount of potassium salts will separate out. That is, the solution should not be saturated with potassium salts while hot and should remain unsaturated even on cooling, although it may advantageously approach the degree of saturation where separation on cooling would take place.

After a solution of the mixed crystals of the proper strength or concentration has been made, this solution is cooled down to ordinary temperature, with the resulting separation of borax therefrom in a substantially pure state. As much as 85 per cent. or more of the borax may be thus removed, with the resulting production of a solution or mother liquor much richer in potassium salts than it is in borax.

The separated borax is filtered off and the mother liquor again evaporated until potassium salts in large quantities have separated out during the evaporation. These potassium salts separate in a relatively pure state i. e., relatively free from borax and are filtered off while hot. The mother liquor is then permitted to cool and a further amount of potassium salts is separated therefrom at temperatures preferably above 150° to 130°, but depending upon the composition of the solution. As hereinbefore noted the temperature range stated is subject to variation and is not therefore to be taken as a limitation of the invention. These potassium salts are then filtered off, and the solution further cooled, whereupon a crop of mixed crystals potassium salts and borax is obtained. That is, the concentration and cooling of the liquor gives relatively pure potassium salts if the cooling is stopped at the proper temperature, and, thereafter, the potassium salts are obtained in admixture with borax in the form of mixed crystals which can be used as the starting material for a further separation. The cold liquor remaining after the separation of the mixed crystals can be again evaporated and recrystallized for the obtaining of further amounts of potassium salts and a mixture of potassium salts and borax.

The liquor remaining after the first separation of borax, potassium salts and mixed crystals, instead of being reconcentrated, can be used to dissolve further amounts of mixed crystals in a heated state and the resulting solution subjected to the same general procedure outlined above for the recovery of borax and potassium salts, both relatively pure, and for the subsequent recovery of mixed crystals which can be added to other like mixtures for similar treatment.

As a result of the improvements of the present invention, the potassium salts and borax can be obtained in high state of purity and ready for the market, while mixed crystals can be obtained in a form well adapted for further treatment for the separation of merchantable potassium salts and borax therefrom. The method as herein described is particularly advantageous because of the relatively large quantity of borax in a substantially pure condition which is thereby recovered.

While the various steps of the process, including the preliminary preparation of the mixed crystals, and the subsequent treatment thereof for the separation of potassium salts and borax, are advantageously combined as a part of the same process, nevertheless, certain of these steps are capable of more general application, and may be separately used or combined with other steps varying from those above described. The mixed crystals may, for example, be prepared and shipped to another place of treatment or of use. So, also, mixed crystals produced otherwise than by the specific process above described can be separated into relatively pure potassium salts and borax by the separation steps of the process of the present invention. Impure potassium salts, containing admixed borax, produced by prior processes, can thus be treated, according to the present invention, for the separation of potassium salts and borax of high purity therefrom.

I claim:

1. The method of recovering potassium salts and borax from alkaline brines containing sodium salts, which comprises concentrating the brines to remove a considerable portion of the sodium salts, cooling the concentrated brines for the recovery therefrom, first, of potassium salts relatively free from borax and, second, of mixed potassium and borax crystals, acidifying the cold mother liquor to remove a portion of the alkalinity, and further concentrating and cooling the resulting solution for the separation of sodium salts, of relatively pure potassium salts, and of mixed crystals of potassium salts and borax, therefrom; substantially as described.

2. The method of recovering potassium salts and borax from brines containing sodium salts, which comprises concentrating the brines to remove a considerable portion of the sodium salts, subjecting the concentrated brine to a two-stage cooling operation, first, to separate therefrom potassium salts relatively free from borax and, second, at a lower temperature, to separate mixed crystals of potassium salts and borax, acidifying the mother liquor with hydrochloric acid until its alkalinity calculated as sodium oxid is about enough to form borax with the total amount of boric oxid present, again concentrating the liquor, and again cooling it for the preparation of further amounts of potassium salts and borax therefrom; substantially as described.

3. The method of recovering potassium salts and borax from brines containing them, which comprises concentrating the brine until it is saturated or nearly saturated in potassium salts, cooling the brine to separate potassium relatively free from borax before the separation of borax, separating the crystallized potassium salts and further cooling the brine to separate a mixture of potassium salts and borax; substantially as described.

4. The method of recovering potassium salts and borax from concentrated brines containing the same, which comprises subjecting the brine to a two-stage cooling operation, first, to separate potassium salts substantially free from borax, and, second, to separate a mixture of potassium salts and borax, and separately collecting the potassium salts and the mixed crystals; substantially as described.

5. The method of recovering potassium salts and borax from brines of the character of Searles Lake brine, which comprises concentrating the brine to remove a considerable portion of the sodium salts, cooling the concentrated brines for the separation of potassium salts and borax therefrom, acidifying the cold mother liquor to reduce its alkalinity, concentrating, the resulting solution for the separation of further amounts of sodium salts, and cooling the concentrated liquor for the recovery of further amounts of potassium salts and borax; substantially as described.

6. The method of improving the recovery of potassium salts and borax from alkaline brines containing them, which comprises acidifying the brine to reduce its alkalinity, concentrating the resulting brine and cooling the concentrated brine, substantially as described.

7. The method of recovering potassium salts and borax from alkaline brines containing sodium salts, which comprises adding hydrochloric acid until the alkalinity calculated as sodium oxid is approximately such as to form borax with the total amount of boric oxid present, concentrating the resulting liquor, and cooling the concentrated liquor for the recovery of potash and borax therefrom; substantially as described.

8. The method of recovering potassium salts and borax from brines containing sodium salts, which comprises concentrating the brine for the separation therefrom of a considerable portion of the sodium salts, cooling the concentrated brine in two successive stages and thereby separating, first, potassium salts relatively free from borax, and thereafter, a mixture of potassium salts and borax containing an excess of borax, dissolving the separated mixed crystals to form a hot solution from which no appreciable amount of potassium salts will separate when cold, cooling the solution for the separation of borax therefrom, and concentrating the remaining liquor for the separation of potassium salts therefrom; substantially as described.

9. The method of recovering potassium salts and borax from mixed crystals containing an excess of borax, which comprises dissolving the mixed crystals in hot water or a hot aqueous liquor to form a solution nearly saturated with potassium salts when cold, cooling the solution for the separation of borax therefrom, and concentrating the resulting liquor to effect the separation of potassium salts therefrom; substantially as described.

10. The method of recovering potassium salts and borax from mixed crystals containing an excess of borax which comprises dissolving the mixed crystals in hot water or a hot aqueous liquor to form a solution nearly saturated with potassium salts when cold, cooling the liquor to separate borax therefrom, concentrating the resulting liquor to recover potassium salts therefrom, and subsequently cooling to obtain further amounts of potassuim salts and borax therefrom; substantially as described.

11. The method of recovering potassium salts and borax from brines of the character of Searles Lake brine, which comprises concentrating the brine to remove a considerable portion of the sodium salts, cooling the concentrated brine in two successive stages, first, to a temperature of about 115° to 130° C. for the separation of potassium salts therefrom relatively free from borax, and thereafter, to a lower temperature for the separation of a mixture of potassium salts and borax; substantially as described.

12. In the recovery of potassium salts and borax from alkaline brines containing them, the improvement which comprises acidifying the brine to reduce its alkalinity until its alkalinity, calculated as sodium oxid, is about enough to form borax with the total amount of boric oxid present, and thereafter separating potassium salts and borax from the thus neutralized brine; substantially as described.

13. The method of recovering potassium salts and borax from alkaline brines containing sodium salts, which comprises concentrating the brine to remove a considerable portion of the sodium salts therefrom, acidifying the brine until its alkalinity, calculated as sodium oxid, is about enough to form borax with the total amount of boric oxid present, and thereafter separating potassium salts and borax from the brine; substantially as described.

14. The method of recovering potassium salts and borax from solutions containing an excess of potassium salts, which comprises concentrating such solution to effect separation of potassium salts therefrom without separation of borax, separating the potassium salts, and cooling the brine to separate further amounts of a mixture of potassium salts and borax; substantially as described.

15. The method of recovering potassium salts and borax from mixed crystals containing approximately twice as much borax as potassium salts, which comprises dissolving the mixed crystals in hot water or a hot aqueous liquor to form a solution nearly saturated with potassium salts when cold, cooling the solution for the separation of borax therefrom, relatively free from potassium salts, and concentrating the resulting liquor to effect the separation of potassium salts therefrom relatively free from borax; substantially as described.

In testimony whereof I affix my signature.

KARL J. JACOBI.